Nov. 19, 1940.   R. K. BURFORD   2,222,221
METHOD AND APPARATUS FOR TESTING STEEL STRIP THICKNESS
Filed Oct. 14, 1937   3 Sheets-Sheet 1

Inventor
Robert K. Burford,
By Cushman, Darby & Cushman
Attorneys

Nov. 19, 1940.   R. K. BURFORD   2,222,221
METHOD AND APPARATUS FOR TESTING STEEL STRIP THICKNESS
Filed Oct. 14, 1937   3 Sheets-Sheet 2

Inventor
Robert K. Burford
By Cushman, Darby, Cushman
Attorneys

Nov. 19, 1940.   R. K. BURFORD   2,222,221
METHOD AND APPARATUS FOR TESTING STEEL STRIP THICKNESS
Filed Oct. 14, 1937   3 Sheets-Sheet 3
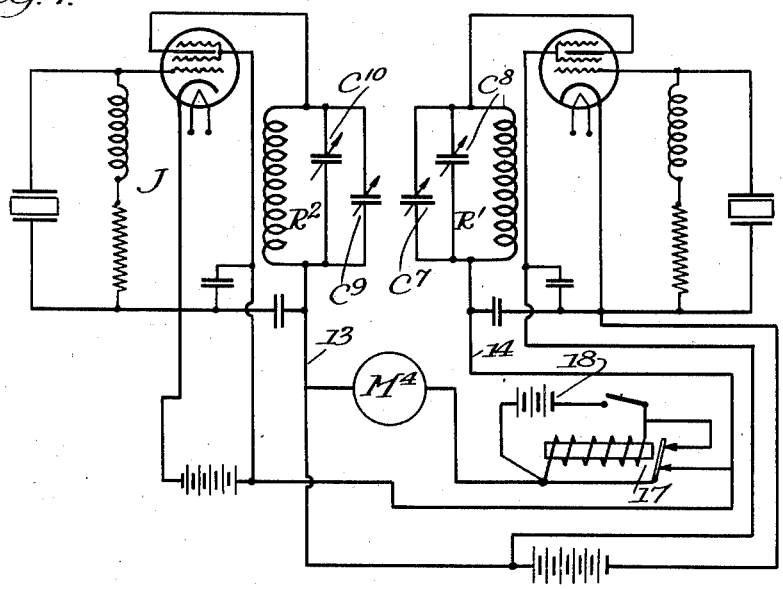
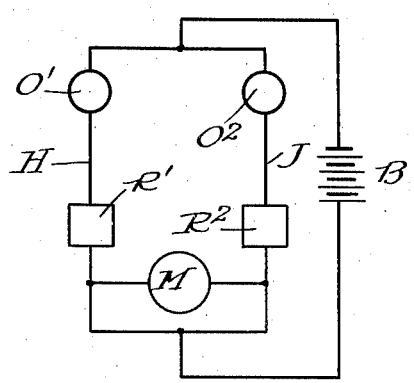
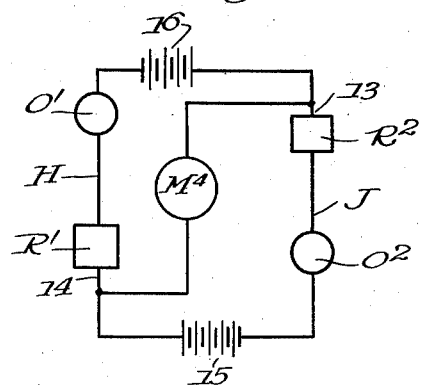
Inventor
Robert Burford.
By Cushman Darby + Cushman
Attorneys Patented Nov. 19, 1940

2,222,221

UNITED STATES PATENT OFFICE 2,222,221

METHOD AND APPARATUS FOR TESTING STEEL STRIP THICKNESS

Robert K. Burford, Gary, Ind.

Application October 14, 1937, Serial No. 169,044

11 Claims. (Cl. 175—183)

This invention relates to an electrical means for measuring the characteristics of materials, particularly for measuring the thickenss of materials. The invention also contemplates the comparison of characteristics of separate portions of the material being investigated, particularly, a comparison of the thickness of separate portions thereof.

As an example of one use of the invention I have shown herein apparatus for instantly indicating the reduction caused in a steel strip being passed through a rolling mill.

It has for an object to provide an electrical circuit having known or predetermined current characteristics, the variations of which are responsive to the thickness of the steel strip being calipered.

Another object of the invention is to provide a circuit that may be adjusted to cover a wide range of thickness in the material being calipered.

Another object of the invention is to provide several means to accomplish this adjustment, the particular means used depending upon the desired variation sought in the current characteristics.

A further object is to incorporate in the circuit an extremely sensitive meter responsive only to variations in current conditions to measure the amount of reduction in thickness of the material taking place.

Another object is to provide several ways in which the meter may be incorporated in the circuit.

For a more complete understanding of this invention, reference may be had to the drawings and specification.

In the drawings:

Figure 7 is a diagram of the preferred hook-up;

Figure 8 is an elementary diagram of the hook-up of Figure 7; and

Figure 9 is an elementary diagram of the hook-up shown in Figures 2 and 4.

Figure 1:
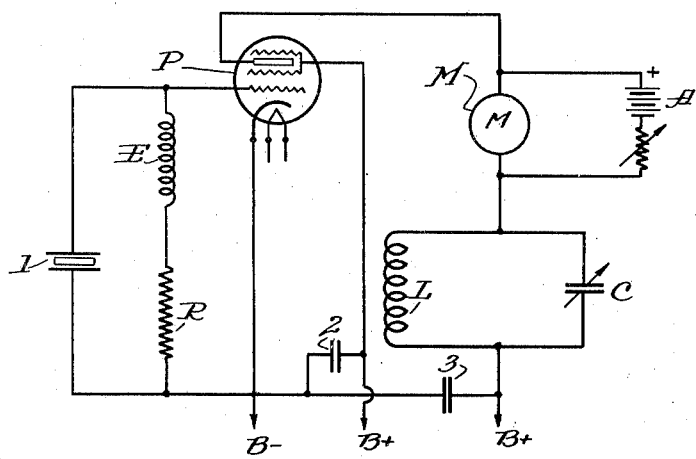
Figure 1 is an electrical diagram of the fundamental circuit.
Figure 3:
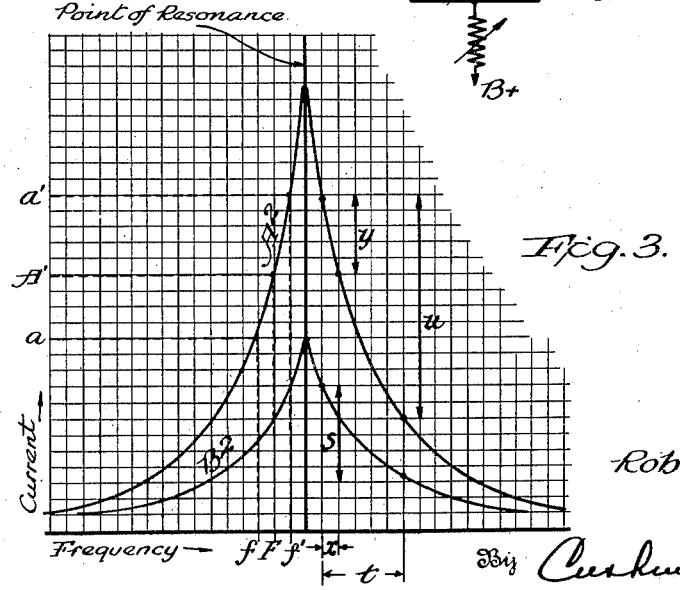
Figure 3 is a graph of the impedance in the circuit under various conditions.

The operation of the fundamental circuit is best understood by referring to Figure 1, wherein the oscillating current of a piezo-crystal controlled circuit is impressed upon a pentode tube P. Throughout the application, by the term oscillating current I mean to include true alternating current, or pulsating current as is produced by the preferred form of the apparatus. Connected into the plate circuit of the tube is a resonant circuit including an inductance L and a variable condenser C, hooked up in parallel, the frequency of said circuit being adjustable by changing the capacity of the condenser C. As the frequency of this circuit is changed to correspond to the frequency of the piezo-crystal circuit, resonance is approached and the resulting impedance to the current flow taking place in the plate circuit of the tube P under various conditions is shown by the curves of Figure 3. These curves show that as the point of resonance is approached, the impedance to the current approaches a maximum and the curves are relatively steep. If the circuit is tuned past the point of resonance the impedance curves fall off rather rapidly at first and then less rapidly. The current in the resonant circuit varies inversely as the impedance. This characteristic is well known.

The apparatus is used to measure the characteristics of a material by placing said material between the plates of condenser C and as will be explained hereinafter this controls the current flow in the plate circuit of the pentode tube. This apparatus is particularly adapted to measure the characteristics by this method because of the phenomenon of resonance. As shown by the curves of Figure 3 any slight change in frequency is followed by a marked impedance variation and therefore a corresponding current change which change becomes greater the closer resonance is approached. By taking advantage of this known current characteristic of the circuit an extremely sensitive measuring device is obtained.

If the resonant circuit is tuned to a frequency slightly short of or past resonance while a standard sample of the material is between the plates of condenser C, a certain current will flow in the plate circuit, which may be measured by the meter M connected in said circuit. It is well known that the dielectric strength of the insulation between the plates of a condenser influences its capacity. In the present apparatus the variable condenser C is an air condenser, the dielectric strength of the insulation of which is determined by the combination of air and the sample of material between its plates. It is apparent that if the characteristics of the material being tested vary from those of the sample, the dielectric strength of the insulation is changed, varying the capacity of the condenser. This change of capacity changes the frequency of the circuit, throwing it more or less out of resonance with the oscillating circuit, causing a marked variation in the current conditions in the plate circuit. This variation interpreted by means of the meter M tells in what way the characteristics have changed.

For example, if the apparatus is used to measure the thickness of a steel strip running through a rolling mill, a hook-up as shown in Figure 1 is used. The oscillating circuit composed of the piezo-crystal 1 connected in parallel with the resistance R and inductance E is grounded to the minus pole of a B battery. The output of the oscillating circuit is connected to the control grid of the power pentode tube P. The other elements of the power pentode are hooked up in the usual manner, i. e., the filament is heated by a proper voltage, the cathode grid is grounded to the minus terminal of the B battery, the high voltage grid is connected to a suitable source of B voltage and is also shunted to the ground circuit by means of a fixed condenser 2, and the plate is connected up to the resonant circuit L and C. The plate circuit includes an inductance L and a variable condenser C connected in parallel and tapped into the plus terminal of the B battery. A fixed condenser 3 shunts the plate circuit to the ground circuit.

The resonant circuit is tuned to a frequency near resonance with the frequency of the oscillating circuit by varying the capacity of the variable air condenser C while a piece of steel of standard thickness is passing between its plates. A certain current flow corresponding to the impedance of the resonant circuit then takes place in the plate circuit which is indicated by the meter M. If the circuit is tuned to frequency F, on curve $A^2$, Figure 3, the impedance is represented by the ordinant $A'$ and this impedance will govern the current flow in the circuit just as long as the frequency of the resonant circuit remains constant. If, however, the thickness of the steel running between the plates of the condenser C changes, the dielectric strength of the insulation between the plates will change correspondingly because the effective insulation is made up of a layer of steel between two layers of air. The corresponding change in dielectric strength will change the capacity of the variable condenser accordingly and thus change the frequency of the resonant circuit. Such change of frequency as to $f$ or $f'$, Figure 3, in the resonant circuit is reflected in a change in the impedance of the resonant circuit and the meter M will measure a current corresponding to impedance $a$ or $a'$ on curve $A^2$, giving a marked variation in current corresponding to the thickness of the material. As above explained this is due to the peculiar flow of current in the plate circuit due to the impedance of the resonant circuit at frequencies approaching resonance.

It is evident, therefore, that a properly calibrated meter could be made to read the actual thickness of a strip of steel passing between the plates of the variable condenser by measuring the change in current flow of the plate circuit.

If the meter M were to read the total current flowing in the plate circuit plus or minus any fluctuation, the indication apparent on the meter, while readable, would only cover a small part of the dial and would thus be difficult to read accurately. To overcome this objection, a small battery A and a variable resistance are connected in a potentiometric circuit through the meter M. This battery circuit neutralizes the plate current in the meter and a more sensitive meter responsive only to the fluctuation need be used. Thus, with the deflection covering substantially the full dial a much more accurate indication of the current change may be had and a more accurate reading therefore may be had of the thickness of the material passing between the plates of condenser C.

By means of this apparatus, it is apparent how the plates of condenser C may be placed one above and one below the strip of steel passing through the steel mill and an accurate, instantaneous reading of the thickness of the strip may be had.

Though it is desirable to know the thickness of a strip of steel passing through a rolling mill, a more important factor that has heretofore been impossible to instantaneously obtain is the reduction taking place. Reduction is the change in thickness caused by the strip passing between the rolls of a temper pass, cold reduction mill or similar machinery. The invention here disclosed provides an apparatus that will give an instantaneous indication of the amount of reduction taking place. This apparatus is composed of two resonant circuits as above described that are electrically responsive to the thickness of steel passing between the plates of their condensers. The resonant circuits are supplied with suitable oscillating current and the desired measurement is obtained in the manner hereinafter disclosed.

Figure 4:
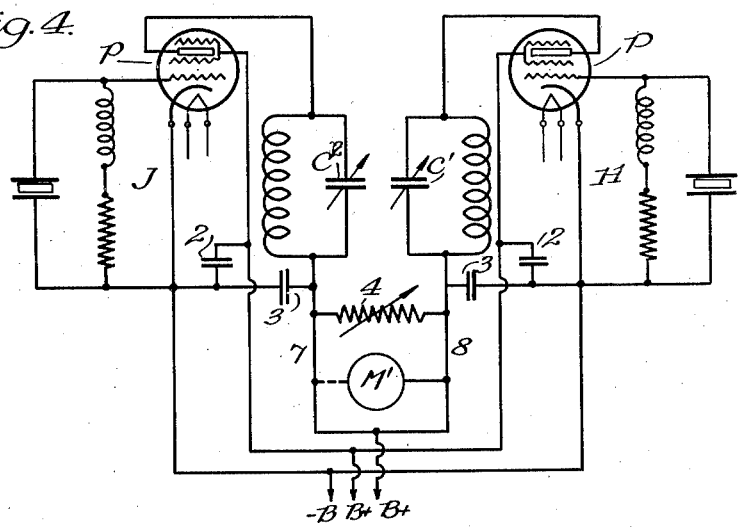
Figures 4 and 5 are diagrams of modified forms of the electrical hook-up.

The apparatus best adapted to this purpose is disclosed in Figure 4. It consists of two complete circuits as described in Figure 1. In order to determine the amount of reduction taking place, one variable condenser $C'$ of circuit H is placed on the forward side of the rolls and variable condenser $C^2$ of the circuit J is placed on the outward side of the rolls and the output of the resonant circuit containing condenser $C^2$ is passed through meter $M'$ in such a manner as to buck the output of the resonant circuit containing condenser $C'$, having an effect similar to the action of the battery A of Figure 1. This bucking is accomplished by the circuit shown in Figure 4, wherein a variable resistance 4 and the meter $M'$ are connected in parallel between the output lead 7 of circuit J and output lead 8 of circuit H. If there is no reduction taking place, the output or current flow in the two output leads will be exactly the same and any current tending to flow through the meter in one direction from one lead will be neutralized by an equal current tending to flow through the meter in an opposite direction from the other lead. When a reduction is taking place, however, the current flowing in the output lead 7 is different from the current flowing in the output lead 8, because the difference in thickness has changed the frequency of the resonant circuit containing condenser $C^2$, throwing it to a greater or less extent out of resonance with its oscillating circuit. This unbalanced current flow in the output leads causes a current to flow through the meter and the meter having previously been calibrated, it gives an instantaneous indication of amount of reduction taking place. The variable resistance 4 in parallel with the meter is merely to control the amount of current passing through the meter i. e., if desirable it is possible to by-pass some of the current through the variable resistance 4.

The apparatus just described to measure reduction instantaneously may be used in various ways. As above disclosed, it may be adjusted so that circuits H and J will produce the same plate current when no reduction is taking place, the meter then giving a positive indication corresponding to the actual reduction or percentage of reduction taking place, or the apparatus may be tuned so that the meter will give no indication when a certain reduction is had and giving a positive indication only when the finished product varies from the required standard. The latter is accomplished by calibrating the separate circuits J and H with different standard thicknesses of the material.

Figure 2:
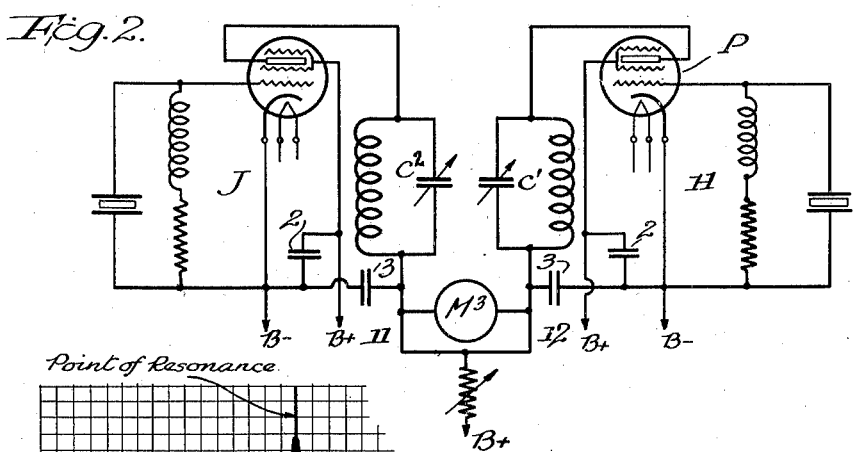
Figure 2 is a diagram of the hook-up of one adaption of this invention.
Figure 5:
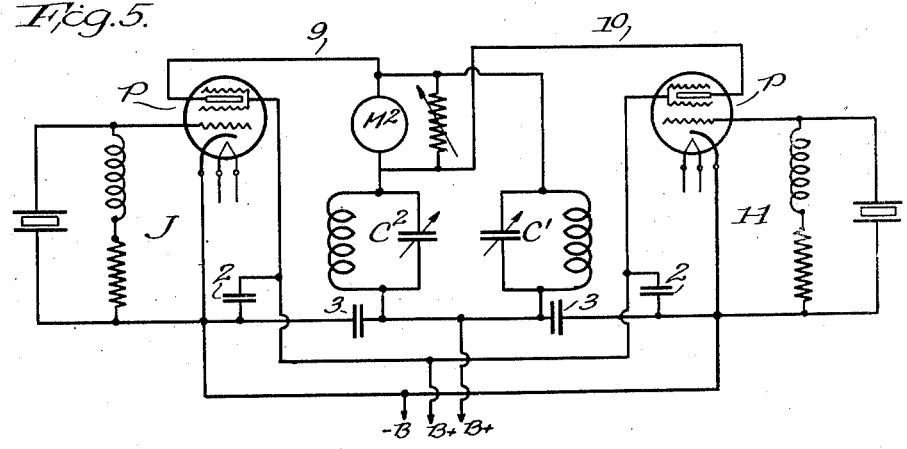

Alternate methods of hooking up the meter are shown in Figures 2, 5 and 7. That disclosed in Figure 5, shows the meter $M^2$ connected in the input lead 9 to the resonant circuit containing the condenser $C^2$ and in this instance the flow of current in the lead 10 of the other oscillating circuit H is biased through the meter to buck the current of the first circuit J. Any unbalance between the current flowing in the plate circuits will be indicated by the meter $M^2$ and the amount of reduction obtained will thus be instantaneously recorded.

Another method disclosed in Figure 2 is designed to permit the apparatus to be used over a wide range of reductions in the thickness of the material and to accomplish this a variable resistance is connected in series between the output leads 11 and 12 of the resonant circuits and the plus terminal of the B battery. As in the circuit of Figure 5 the meter $M^3$ is connected across the two leads in order to obtain the bucking effect between the two circuits as explained with reference to Figure 5.

An explanation of the reason for the hook-up of Figure 2 is best had by referring to Figure 3. It is common practice to cause reductions of from $\frac{1}{4}$ of 1% to $\frac{3}{4}$ of 1%. If then the apparatus of Figures 4 and 5 were set up to measure the $\frac{1}{4}$% reduction the variation caused in the capacity of condenser $C^2$ by this light reduction might cause the frequency to vary an amount equal to X, Figure 3 while the impedance varied an amount equal to Y. Now if a $\frac{3}{4}$% reduction is caused this greater change in thickness might cause a frequency change equal to $t$ and an impedance variation equal to $u$. It is probable then that a meter capable of measuring the variation equal to $u$ would not accurately indicate the amount $y$ and to overcome this objection, the variable resistance hooked up as in Figure 2 is useful.

This resistance is connected in series in the plate circuit and therefore reduces the amount of the current flowing in the circuit and if more resistance is cut in when the $\frac{3}{4}$% reduction is being rolled, the sensitivity of the plate circuit will be cut down and a curve such as $B^2$, as in Figure 3, may be obtained. It is seen then that a frequency change of $t$ would cause a relatively smaller impedance variation of $s$ on curve $B^2$ and the same meter that was used on the $\frac{1}{4}$% reduction would also give accurate indications for $\frac{3}{4}$% reduction.

Somewhat the same result is obtained by the variable shunt 4 of Figure 4. In this case the amount of current flowing in the plate circuits is the same for $\frac{1}{4}$% and $\frac{3}{4}$% reduction but the current permitted to flow through the meter is controlled by the variable shunt 4. When a large current flow caused by the unbalanced condition resulting from the reduction of $\frac{3}{4}$% is encountered the resistance of the shunt 4 is diminished and most of the current is bypassed around the meter through the shunt. Thus it is possible to use a very sensitive meter capable of measuring the current fluctuation caused by the reduction of $\frac{1}{4}$% on an apparatus measuring the reduction of $\frac{3}{4}$%. In this instance however it is necessary to very carefully calibrate the shunt and for this reason it is believed that a more practical hook-up is shown in Figure 2.

Another and the preferred method of accomplishing the above results is to adjust the sensitivity of the circuits by spacing the plates of condenser $C'$ and $C^2$ more or less away from the surfaces of the steel strip. If the reduction is great the plates will be spaced farther away from the surfaces decreasing the sensitivity to obtain the curve $B^2$ and if the reduction is small the plates will be brought closer to the surfaces increasing the sensitivity to obtain the curve $A^2$. In this way the sensitivity of the capacity variation of the condenser is controlled and its is possible to use one meter to cover a wide range of reductions.

The preferred meter circuit comprises connecting the meter $M^4$ in series with each of the circuits H and J so that the current of one circuit bucks the current of the other circuit. The manner of accomplishing this is shown in Figures 7 and 8 wherein circuit H composed of the oscillator $O'$, the resonant circuit $R'$ and the B battery 16 is connected in series with the meter $M^4$ and also, circuit J composed of the oscillator $O^2$, the resonant circuit $R^2$ and B battery 15 is connected in series with the meter $M^4$. This circuits J and H are connected through the meter so that the flow of one circuit will oppose the flow of the other circuit, and thus if both currents are of equal intensity they will exactly neutralize each other and no current flow will take place through the meter. But if the impedance of the resonant circuit $R^2$ is changed the current flow through circuit J varies accordingly as above explained and the varied current more or less opposes the current tending to flow through meter $M^4$ in the opposite direction from circuit H. For example if the impedance of $R^2$ is increased the effective resistance of circuit J is increased and less current will flow through meter $M^4$ connected in series with circuit J. Such reduction in current through the meter lessens the opposition to the current flowing through meter $M^4$ and circuit H and this unbalanced current condition causes the meter to indicate the reduction taking place. It is to be noted that by this arrangement as the effective resistance of circuit J is increased by a change in impedance the effective resistance of circuit H is decreased because the opposing current through meter $M^4$ has been reduced. This results in an additive effect in the unbalancing of the current condition through the meter giving a greater current fluctuation to indicate reductions. Such an effect is desirable because it makes for more accurate instrument readings.

A circuit breaker 17 is connected in series with the meter $M^4$ and between both circuits J and H so that if any unusual current flow should accidentally be encountered the meter would be protected. A small amperage battery 18 is biased around the circuit breaker and its current flow normally tends to oppose the current flowing through the solenoid. However if a harmful amount of current tried to flow through the circuit the solenoid would be energized thus breaking the circuit.

Figure 6:
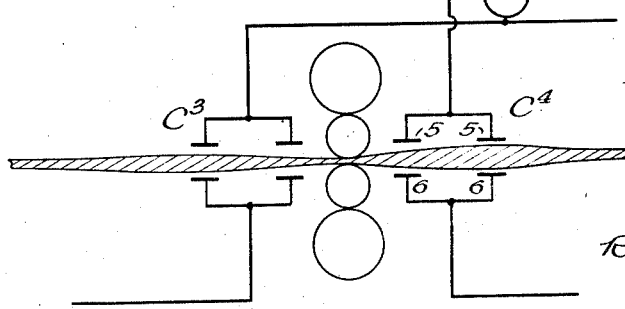
Figure 6 is the preferred form of condenser plate arrangement.

The preferred form of the plate arrangement of the variable condenser is shown in Figure 6. A strip of commercial steel ordinarily has some differences in thickness throughout its length, as shown in exaggerated fashion in Figure 6, and this slight difference in itself would produce an indication on the meter M, if only a two-plate condenser were used, but, as shown, the variable condenser $C^4$ is made up of four plates 5 and 5, 6 and 6, two on each side of the strip. Plates 5 and 5 on the upper side are connected in parallel with one another and plates 6 and 6 on the under side are also connected in parallel with one another. Thus the opposing plates 5 and 6, and 5 and 6 form two condensers connected in parallel and the sum of the capacities of these condensers so connected is equal to the capacity of condenser $C'$ or $C^2$ for which it is substituted. In this manner, the condenser $C^4$ is enabled to take a better average reading of the thickness of the steel passing through it. The condenser $C^3$ is made up in a similar way, so that the overall error due to the small irregularities inherent in commercial steel may be minimized.

It is apparent to those skilled in the art that the above apparatus will operate at radio frequencies. However, such frequencies are not essential, as lower frequencies conceivably could be used, but due to mechanical limitations it is preferred to use the higher frequencies.

While the description of the apparatus has been applied to instantaneously measuring the reduction given a steel strip, this is merely exemplary and the invention is also adapted for uses where an instantaneous record of the change in any characteristics of a material is desirable. Other forms or modifications may be apparent to those skilled in the art without departing from the spirit or scope of the invention.

I claim:

1. In an apparatus of the class described, a plurality of controlled oscillating current generators, a resonant circuit connected respectively with each of said generators through respective thermionic amplifiers, said resonant circuits being positioned at relatively widely spaced points along the length of a strip of material, each of said circuits being electrically responsive to the thickness of the material, a meter connected between said circuits for measuring a difference in current flow in said circuits caused by the difference in the thickness of said portions of the material, and means between said spaced points to vary the thickness of said material.

2. In an apparatus of the class described, a plurality of controlled oscillating current generators, a resonant circuit connected respectively with each of said generators, said resonant circuits being positioned adjacent different portions of a strip of material and being electrically responsive to the thickness thereof, and a meter connected in parallel with a variable resistance between the output leads of said circuits for measuring a difference in current flow in said circuits caused by the difference in the thickness of said portions of material.

3. In an apparatus of the class described, a plurality of controlled oscillating current generators, a resonant circuit connected respectively with each of said generators, said resonant circuits being positioned adjacent different portions of a strip of material and being electrically responsive to the thickness thereof, and a meter connected across the output leads of said circuits and a variable resistance connected in series with said leads for measuring a difference in current flow in said circuits caused by the difference in the thickness of said portions of material.

4. In an apparatus of the class described, a plurality of controlled oscillating current generators, a resonant circuit connected respectively with each of said generators, said resonant circuits being positioned adjacent different portions of a strip of material and being electrically responsive to the thickness thereof, and a meter connected into the input leads of said circuits so that one current flow tends to buck the other current flow for measuring a difference in current flow in said circuits caused by the difference in thickness of said portions of material.

5. In an apparatus of the class described, a plurality of controlled oscillating current generators, a resonant circuit connected respectively with each of said generators, said resonant circuits being positioned adjacent different portions of a strip of material and being electrically responsive to the thickness thereof, and a meter connected in series with each of the generators and its associated resonant circuit for measuring a difference in current flow in said circuits caused by the difference in thickness of said portions of material.

6. The method of measuring the reduction in thickness of a strip of material which comprises causing a reduction in a strip of material, controlling the oscillating current flowing in two resonant circuits by passing a portion of the strip before and after the reduction is caused in the strip between the plates of the condensers of said circuits, and measuring only the difference in current flow between said circuits caused by said reduction in thickness.

7. A device for indicating the reduction taking place in a material being operated upon, comprising a pair of controlled oscillating current generators, a resonant circuit including a condenser electrically connected to each of said generators, each of said condensers being operatively associated with said material at relatively widely spaced points in such a manner that the material forms at least a portion of the dielectric of said condensers, each of said condensers being responsive to the same characteristics of the material, operating means positioned between said condensers adapted to cause a change in the dielectric value of the material, and a meter connected between said electrical circuits whereby the difference in current flow occasioned by the variation in the capacity of said condensers causes an indication to be given showing the reduction produced by said operating means.

8. A means for measuring a change in the characteristics of a material comprising a pair of controlled oscillating current generators, a resonant circuit respectively for each of said generators, each of said circuits being electrically responsive to the characteristics of a material at relatively widely spaced points along the length of the material, and a meter connected between said circuits for indicating the difference in current flowing in said circuits in response to the characteristics of the material.

9. An apparatus for measuring the change of characteristics of a material comprising a pair of controlled oscillating current generators, a pair of resonant circuits each cooperating respectively with one of said generators, each of said circuits being positioned closely adjacent said generators, each of said circuits being electrically responsive to the characteristics of the material at relatively widely spaced points, and a meter connected between said circuits for indicating a difference in current flowing in said circuits in response to the characteristics of the material.

10. In an apparatus of the class described, a plurality of controlled oscillating current generators, a resonant circuit connected respectively with each of said generators, said resonant circuits being positioned adjacent different portions of a strip of material and being electrically responsive to the thickness thereof, and a meter connected in parallel with a variable resistance between the leads of said circuits for measuring a difference in current flow in said circuits caused by the difference in the thickness of said portions of material.

11. In an apparatus of the class described, a plurality of controlled oscillating current generators, a resonant circuit connected respectively with each of said generators, said resonant circuits being positioned adjacent different portions of a strip of material and being electrically responsive to the thickness thereof, and a meter connected between the leads of said circuits for measuring a difference in current flow in said circuits caused by the difference in thickness of said portions of material.

ROBERT K. BURFORD.